United States Patent
Kurtz (10) Patent No.: US 8,272,207 B2
(45) Date of Patent: Sep. 25, 2012

(54) LATE POST INJECTION OF FUEL FOR PARTICULATE FILTER HEATING

(75) Inventor: Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 12/534,023

(22) Filed: Jul. 31, 2009

(65) Prior Publication Data

US 2011/0023454 A1 Feb. 3, 2011

(51) Int. Cl.
*F01N 3/00* (2006.01)
*F02D 19/10* (2006.01)
*F01L 1/34* (2006.01)

(52) U.S. Cl. ............. 60/285; 60/295; 60/286; 123/299; 123/90.15; 123/27 R (58) Field of Classification Search .................... 60/285, 60/292, 293, 295, 286; 123/299–305, 27 R, 123/90.15

See application file for complete search history.

(56) References Cited

U.S. PATENT DOCUMENTS

| | | | |
|---|---|---|---|
| 6,412,276 B1 | 7/2002 | Salvat et al. | |
| 6,644,023 B2 | 11/2003 | Hirota et al. | |
| 6,959,541 B2 | 11/2005 | Kosaka et al. | |
| 7,779,622 B2 * | 8/2010 | Kondou et al. | 60/286 |
| 2004/0128985 A1 * | 7/2004 | Shimasaki et al. | 60/286 |
| 2007/0062179 A1 * | 3/2007 | Leone | 60/285 |
| 2007/0074702 A1 * | 4/2007 | Nakamura et al. | 123/299 |
| 2007/0137179 A1 | 6/2007 | Kondou et al. | |
| 2009/0164100 A1 * | 6/2009 | Ostberg et al. | 701/103 |
| 2009/0259387 A1 * | 10/2009 | Kakuya et al. | 701/103 |

FOREIGN PATENT DOCUMENTS

EP 1798404 A1 * 6/2007
FR 2885390 A1 * 11/2006

* cited by examiner

*Primary Examiner* — Kenneth Bomberg
*Assistant Examiner* — Abdul Elnoubi
(74) *Attorney, Agent, or Firm* — Julia Voutyras; Alleman Hall McCoy Russell & Tuttle LLP (57) ABSTRACT

Various systems and methods are described for controlling an engine in a vehicle, the engine having a cylinder with a bowl. One example method comprises, during regeneration of a particulate filter positioned in an engine exhaust, timing a late post injection of fuel in an exhaust stroke to spray at least some of the injected fuel into the bowl and without hitting cylinder walls.

20 Claims, 5 Drawing Sheets

LATE POST INJECTION OF FUEL FOR PARTICULATE FILTER HEATING

TECHNICAL FIELD

The present application relates generally to an internal combustion engine having an exhaust passage which includes an emission control device.

BACKGROUND AND SUMMARY

Some particulate filters (PFs) may be cleaned while an engine is in operation via a process called regeneration. During regeneration, the filter is heated above its normal operating temperature to oxidize or burn off particulates that have accumulated in the filter. In addition to, or instead of, employing a heater to increase the temperature of the filter, the engine may be operated in a manner which may assist in the heating of the particulate filter.

One approach to increase the temperature of the filter during regeneration is disclosed in U.S. Pat. No. 6,959,541. In the cited reference, a fuel injection control system performs a post injection (following a main injection) late in an expansion (e.g., power) stroke or early in an exhaust stroke when heat for regeneration of a particulate filter is desired. As such, fuel is supplied to the exhaust passage which is available for oxidation by an oxidation catalyst, thus creating heat to increase the temperature of the particulate filter for regeneration.

In such a configuration, fuel is injected in a cylinder when the piston is far away from the fuel injector (e.g., the position of the piston is closer to bottom dead center than to top dead center). As a result, conditions such as cylinder wall wetting may occur which may lead to fuel-in-oil dilution and/or piston and cylinder wall degradation, for example.

The inventor herein has recognized the above problems and has devised approaches to at least partially address them. Thus, a method for controlling an engine in a vehicle, the engine having a cylinder with a bowl, is disclosed. The method comprises, during a regeneration of a particulate filter positioned in the engine exhaust, injecting fuel into one or more cylinders of the engine at least via a late post injection in an exhaust stroke of an engine cycle, the late post injection occurring sometime after approximately 40 degrees CA before top dead center such that some or all of the fuel is sprayed into the piston bowl.

Specifically, in one example, a piston configured to move within the cylinder has a face with a bowl. Because the fuel injector is close to the face of the piston after 40 degrees CA before top dead center (e.g., the position of the piston is closer to top dead center than to bottom dead center), the fuel injected via the late post injection is injected into the bowl. Further, the timing and amount of the injection may be controlled based on an amount of heat needed to increase the temperature of the particulate filter during regeneration. In this way, the temperature increase of the particulate filter may be facilitated via fuel injection while conditions which may cause degradation of the cylinder and/or other engine components, such as cylinder wall wetting, may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for controlling an engine in a vehicle under conditions in which a particulate filter (PF), such as a diesel particulate filter, coupled to an exhaust passage of the engine is undergoing regeneration. In response to a request for heat to increase the temperature of the particulate filter during regeneration, the engine may be operated in one of two modes. In the first mode of operation, a late post injection is timed to provide at least some injected fuel into a bowl in the piston without hitting cylinder walls. For example, the injection is timed with respect to the piston position moving up during the exhaust stroke so that the fuel is injected with the piston is in a position so that at least some, if not all, of the injected fuel spray is aimed at and impacts the piston face inside the bowl region. In one example, fuel is injected via the late post injection after 40 degrees CA before top dead center during an exhaust stroke of the engine cycle while an exhaust valve is open.

In the second mode of operation, a variable valve actuation (VVA) system is adjusted to temporarily close the exhaust valve before the late post injection . Further, the VVA system opens the exhaust valve before piston top dead center (TDC) to release the gases and fuel into the exhaust manifold and thus the exhaust system and PF. As noted above, in one example, by injecting fuel after 40 degrees CA before top dead center of the exhaust stroke, the fuel may be injected in the bowl of the piston face, thus reducing the possibility of cylinder wall wetting, for example. Further, closing the exhaust valve before the late post injection in the second mode of operation may increase the temperature and pressure (e.g. density) of the gas inside the cylinder, reducing the liquid penetration and wall impingement and increasing the pumping losses, resulting in a smaller amount of fuel needed for the late post injection to increase the temperature of the DPF.

Figure 1:
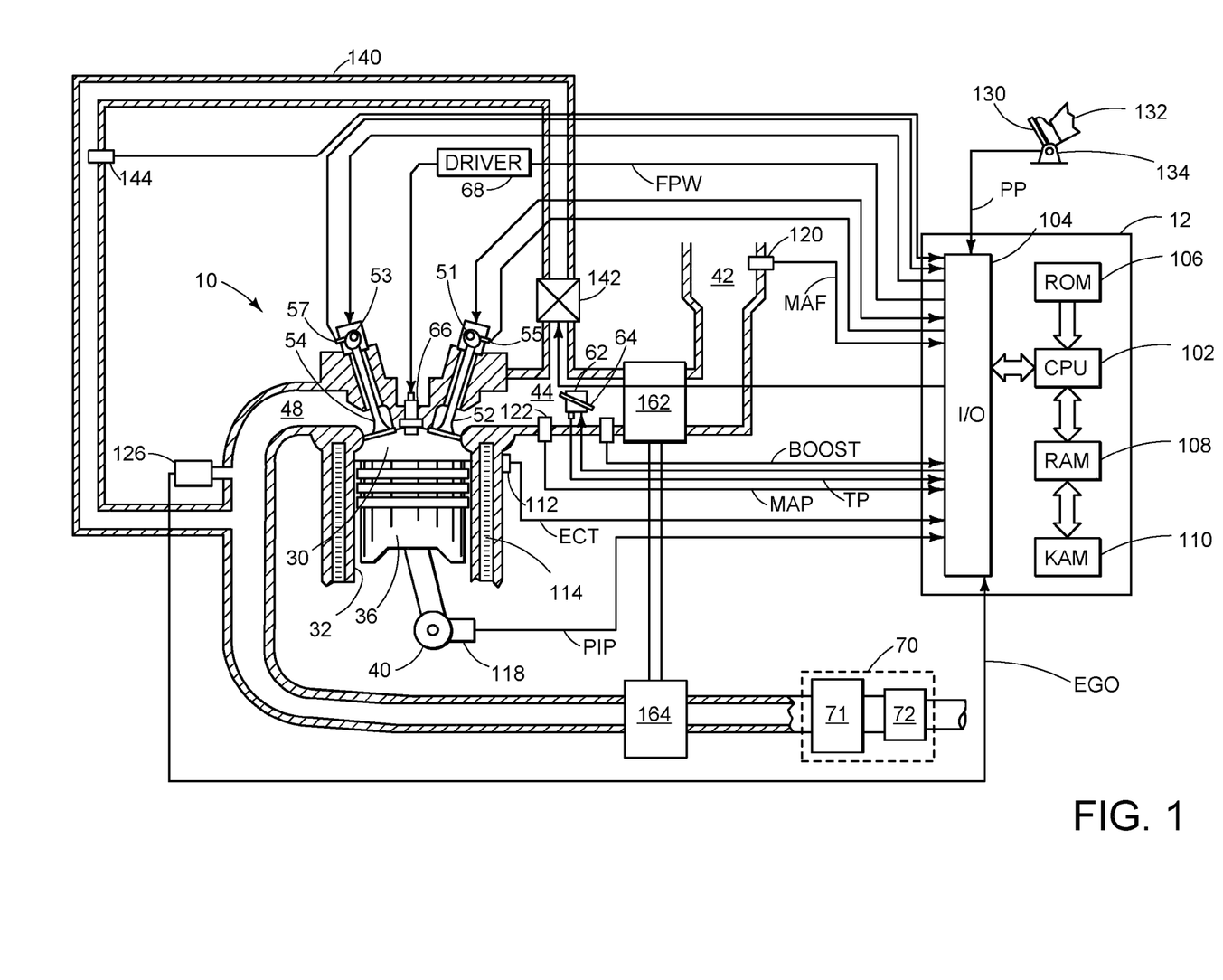
FIG. 1 shows a schematic diagram of an engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein. Fuel injection may be via a common rail system, or other such diesel fuel injection system. Fuel may be delivered to fuel injector 66 by a high pressure fuel system (not shown) including a fuel tank, a fuel pump, and a fuel rail.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. Further, an EGR sensor 144 may be arranged within the EGR passage and may provide an indication of one or more pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust O2 sensor and/or an intake oxygen sensor (intake manifold)]. Under some conditions, the EGR system may be used to regulate the temperature of the air and fuel mixture within the combustion chamber. While FIG. 1 shows a high pressure EGR system, additionally, or alternatively, a low pressure EGR system may be used where EGR is routed from downstream of a turbine of a turbocharger to upstream of a compressor of the turbocharger.

As such, Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control system 70 is shown arranged along exhaust passage 48 downstream of exhaust gas sensor 126. System 70 may be a selective catalytic reduction (SCR) system, three way catalyst (TWC), NOx trap, various other emission control devices, or combinations thereof. For example, system 70 may be an SCR system which includes an SCR catalyst 71 and a diesel particulate filter (DPF) 72. In some embodiments, DPF 72 may be located downstream of the catalyst (as shown in FIG. 1), while in other embodiments, DPF 72 may be positioned upstream of the catalyst (not shown in FIG. 1). Further, in some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
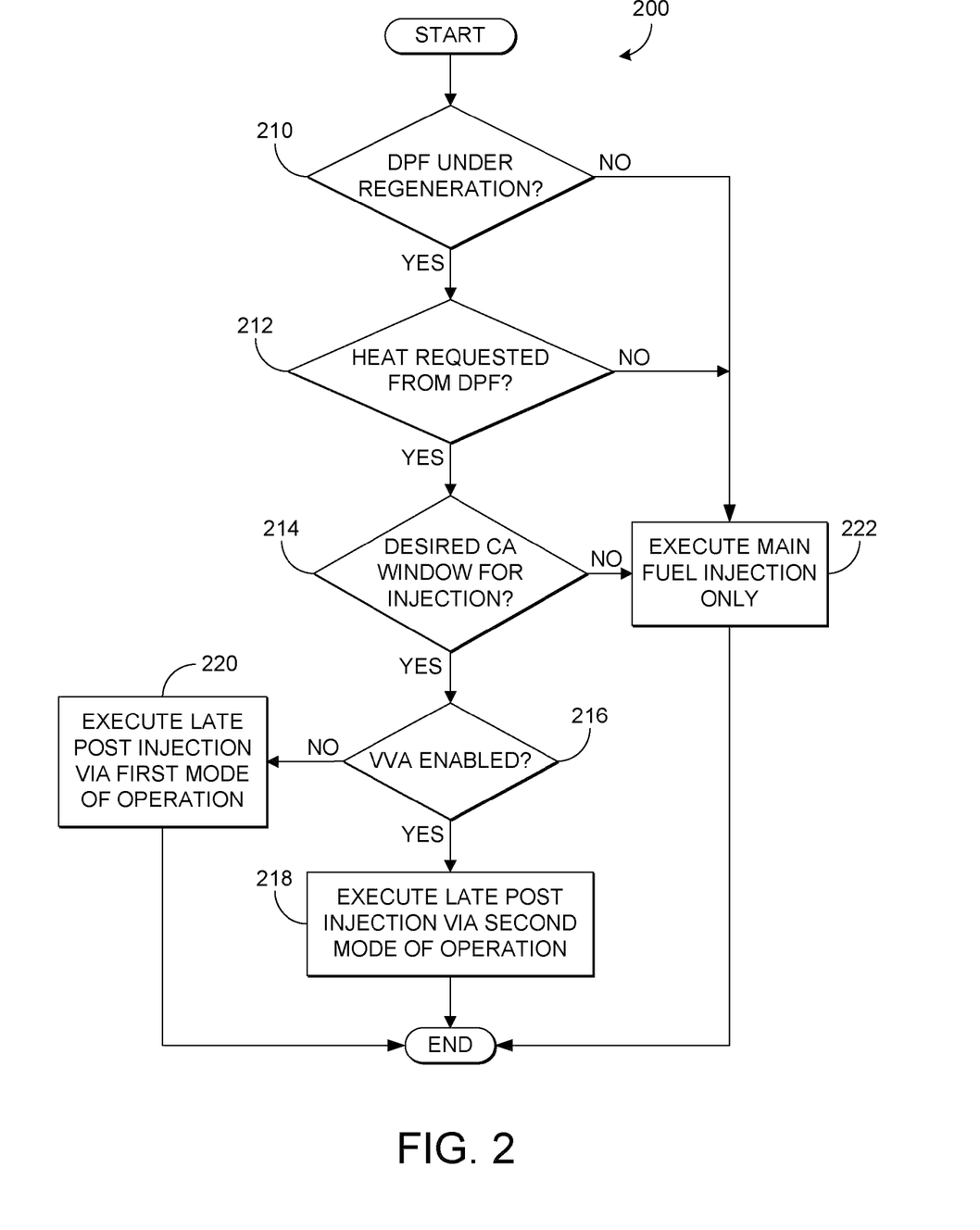
FIG. 2 shows a flow chart illustrating a control routine for late post injection of fuel.

Referring now to FIG. 2, the flow chart in FIG. 2 illustrates a control routine 200 for late post injection of fuel. Specifically, routine 200 adjusts fuel injection to one or more cylinders of the engine in response to a request to increase the temperature of a particulate filter coupled to the exhaust passage, such as diesel particulate filter 72 in FIG. 1.

Figure 5:
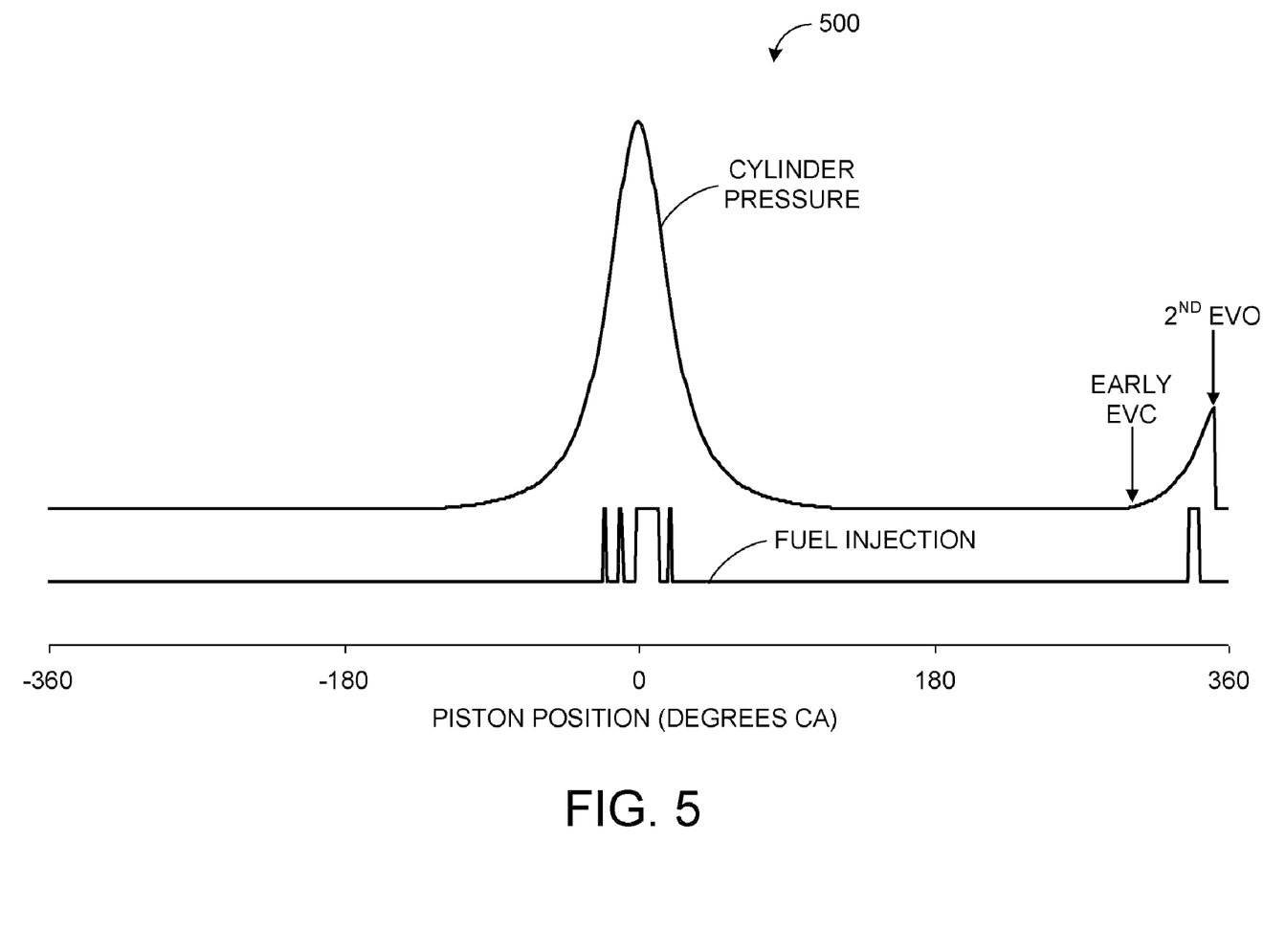
FIG. 5 is a graph showing cylinder pressure trace and fuel injection including a late post injection.

At 210 of routine 200 it is determined if the diesel particulate filter is under regeneration. The regeneration of the filter may be initiated in response to a regeneration request, such as based on an amount of particulate stored in the filter, a pressure drop across the filter reaching a threshold value, etc. If it is determined that the DPF is not under regeneration, routine 200 moves to 222 where one or more a main fuel injections, without post injection, is executed during the engine cycle. In some embodiments, the main fuel injection may include multiple pilot injections, multiple main injections, and/or multiple later injections, all occurring during the compression and expansion strokes while the piston is relatively close to TDC (end of compression/beginning of expansion) (an example is shown in FIG. 5).

On the other hand, if it is determined that the DPF is under regeneration, routine 200 proceeds to 212 where it is determined if the DPF has generated a request for heat. For example, a request for heat may be generated if the particulate filter has not reached a predetermined temperature and/or if the rate of increase of the temperature of the particulate filter is lower than desired. If it is determined that the DPF has not requested heat (e.g., additional heat to increase the temperature of the filter is not desired), routine 200 moves to 222 and only the main fuel injection is executed.

If it is determined that a temperature increase of the filter is desired, routine 200 proceeds to 214 where it is determined if the piston is in the desired crank angle (CA) window for injection. As stated above, the desired CA range for the late post injection may be selected based on a desired piston position given the spray geometry, injector angle, etc., so that at least some of the injected fuel is sprayed into the piston bowl without hitting cylinder walls. As one example, the timing is approximately after 40 degrees CA before top dead center (BTDC) during the exhaust stroke. Thus, fuel injected at this position may be injected into the bowl of the piston as the piston is close to the fuel injector (e.g., the piston is closest to the fuel injector at TDC). If the piston is near bottom dead center (BDC) during the exhaust stroke, the piston is farther away from the fuel injector (e.g., the piston is furthest from the fuel injector at BDC) and fuel injected at this position may spray outside of the bowl and hit the cylinder walls which may result in degradation of the piston and/or cylinder walls, for example. Thus, if the piston is outside the desired CA range for injection, routine 200 moves to 222 where only the main fuel injection is executed.

Figure 3:
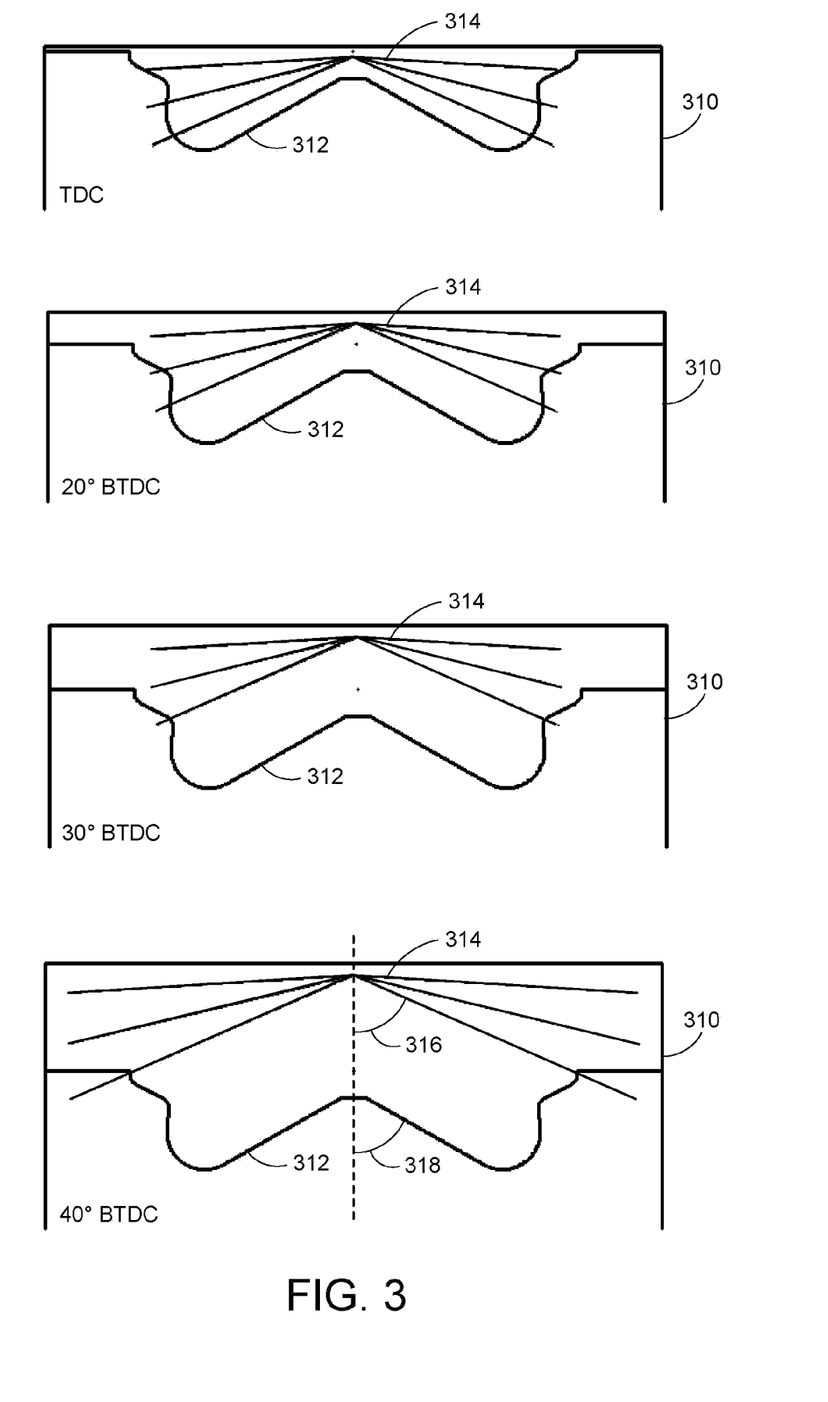
FIG. 3 is a sequence of schematic diagrams illustrating fuel spray relative to the piston bowl.

An example of fuel spray relative to the piston bowl position is illustrated by a sequence of diagrams in FIG. 3. As shown, at 40 degrees CA BTDC, the late post injection commences and at least a portion of the fuel 314 injected into the cylinder 310 impacts the bowl 312 of the piston. As the piston continues moving toward TDC and fuel injection continues, a greater amount of the injected fuel 314 impacts the piston bowl 312 without hitting cylinder walls, with all of the injected fuel 314 impacting the piston bowl 312 near TDC. Since the injection occurs over time and the piston is moving up toward TDC, more fuel is injected in the bowl of the piston by the end of the injection and is thus blocked from hitting the cylinder walls. Further, as shown in FIG. 3, the fuel is sprayed outwardly from the injector forming a reverse cone spray pattern (e.g., the fuel is sprayed such that a cone in which there is no fuel spray is formed). In some embodiments, an angle 316 at the apex of the cone may correspond to an angle 318 of the surface of the bowl inside the piston (e.g., angles 316 and 318 match). Thus, in order to reduce degradation of the piston and/or cylinder walls, the late post injection may be commenced at a time when at least some of the injected fuel impacts the piston bowl, such as after 40 degrees CA BTDC and before the piston reaches TDC (e.g., in order to allow the fuel and gasses in the cylinder to be released to the exhaust manifold).

Turning back to FIG. 2, if it is determined that the piston is in the desired CA range of 30 to 40 degrees CA BTDC for the late post fuel injection, routine 200 continues to 216 where it is determined if variable valve actuation (VVA) is enabled. In embodiments in which VVA is enabled, the timing or shape of a valve (intake and/or exhaust) lift event may be altered. For example, during an engine cycle, an intake valve or an exhaust valve may be opened and/or closed early or late. In another example, as will be described in more detail below, the valve may be temporarily closed during a period when it is usually open (e.g., during the exhaust stroke).

If it is determined that VVA is not enabled, routine 200 moves to 220 where a first mode of operation is carried out in which the late post injection is executed during the exhaust stroke of the engine cycle after 40 degrees BTDC. Because the fuel is injected late in the exhaust stroke of the 4-stroke combustion cycle while the exhaust valve of the cylinder is open and the intake valve of the cylinder is closed, the fuel may not be combusted and, as such, the fuel exits the cylinder as the exhaust stroke continues. In this manner, the fuel that exits the cylinder is carried through the exhaust passage in the exhaust stream to an oxidation catalyst positioned on or upstream of the diesel particulate filter where it is oxidized to create an exotherm across the catalyst, thus increasing the temperature of the DPF.

Figure 4:
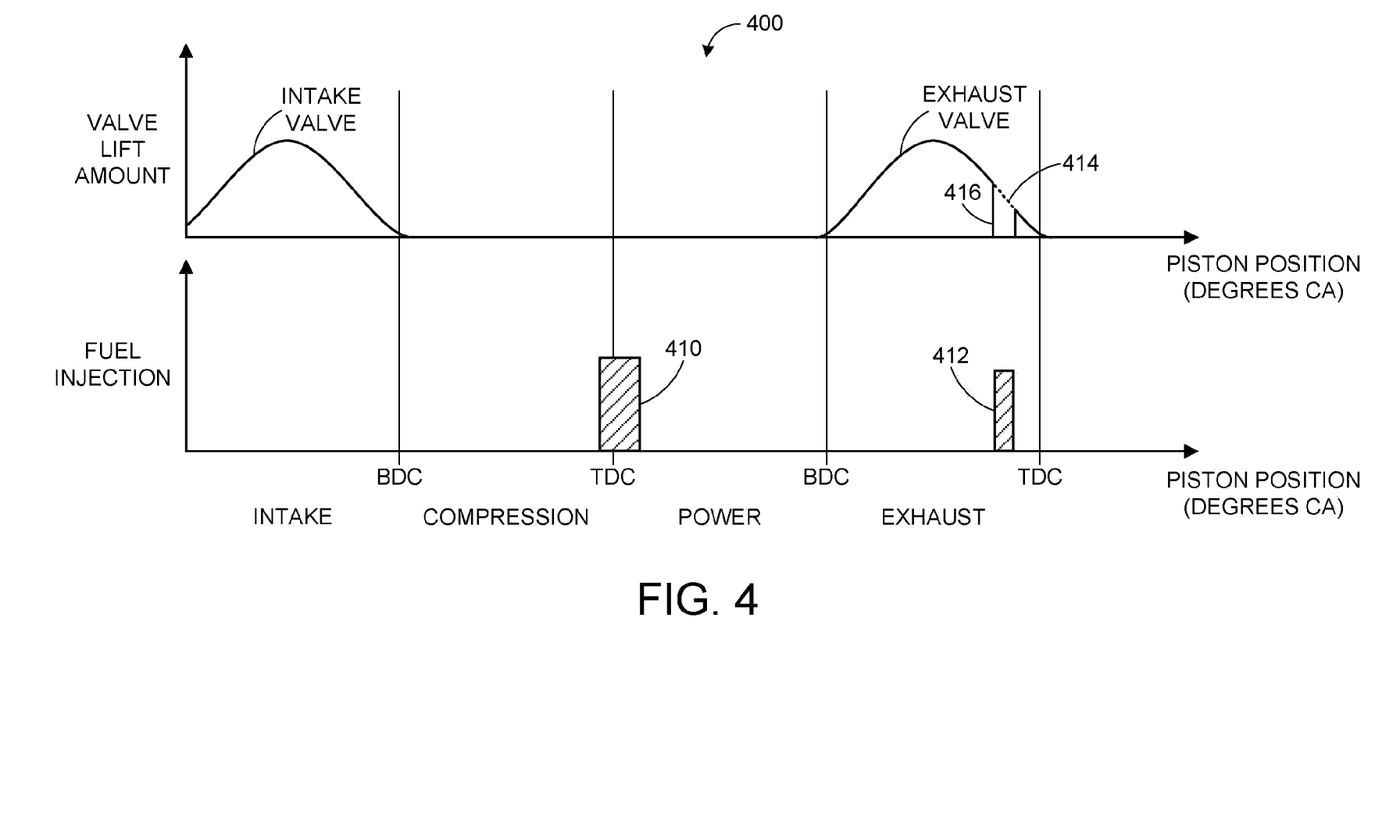
FIG. 4 is a timing chart showing the relationship between valve lifting amounts and fuel injection

An example of the late post injection is depicted in timing chart 400 of FIG. 4 which shows the relationship between valve lift amounts and fuel injection. The main fuel injection is illustrated as occurring near TDC between the compression and power strokes of the 4-stroke engine cycle at 410 of timing chart 400 and the late post injection is illustrated as occurring late in the exhaust stroke (e.g., after 40 degrees CA BTDC) at 412. The exhaust valve lift amount during the late post injection in the first mode of operation is indicated by a dashed line at 414 of timing chart 400. As shown at 414 in FIG. 4, the exhaust valve is maintained open (e.g., the valve is lifted) before, during, and after the late post injection in the first mode of operation.

It will be appreciated that timing chart 400 is one example of a late post fuel injection. For example, the timing of the late post injection and the amount of fuel injected via the late post injection are variable parameters. In some examples, the timing and/or amount of the injection occurring after 40 degrees CA BTDC may be based on an amount of heat requested to increase the temperature of the DPF (e.g., the amount of the desired exotherm) and/or the difference between the current temperature and the desired temperature of the of the DPF. For example, if the late post injection occurs later in the 40 degrees CA BTDC to TDC range, a greater amount of heat may be provided to the DPF than if the injection occurs earlier in the range.

Similarly, the amount of fuel injected during the late post injection may be based on the difference between the current temperature and the desired temperature of the DPF and/or an exhaust air-fuel ratio (e.g., an amount of excess oxygen in the exhaust). For example, if the air-fuel ratio in the exhaust is high, a greater amount of fuel may be desired during the late post injection in order to increase the amount of fuel available for oxidation by the catalyst, and/or to increase the temperature rise due to a greater exotherm with a greater amount of injected fuel in the late post injection.

Furthermore, during a single DPF regeneration, the late post injection via the first mode of operation may occur during one or more engine cycles and the amount and timing of the injection may vary. As an example, the late post injection may occur during three subsequent engine cycles. In another example, the late post injection may occur every other engine cycle throughout a span of ten engine cycles. As described above, the number of engine cycles in which the late post injection occurs and the amount and timing of the injection may depend on parameters such as desired amount of the exotherm at the catalyst and exhaust air-fuel ratio.

Turning back to FIG. 2, if it is determined that variable valve actuation is enabled at 216, routine 200 proceeds to 218 where a second mode of operation is carried out in which the variable valve actuation system is adjusted to temporarily close the exhaust valve in one or more cylinders in which a late post injection is executed. In one example embodiment, prior to commencement of the late post injection during the exhaust stroke, the exhaust valve may be closed and after completion of the late post injection before TDC, the exhaust valve may be opened. In some embodiments, the exhaust valve may be closed earlier than 40 degrees CA BTDC in order to allow for some increase in gas density in the cylinder before the late post injection begins. For example, if the late injection occurs after 40 degrees CA BTDC, the exhaust valve may be temporarily closed between 60 degrees CA BTDC and TDC, but open before TDC of the exhaust stroke. As with the first mode of operation described above, the intake valve may be held closed during the exhaust stroke and, therefore, during the late post injection. In some embodiments, although VVA is enabled, the exhaust valve may be maintained open during the late post injection. This may occur, for example, if the DPF is near its desired temperature and only a small amount of heat is requested.

An example of VVA utilized during the second mode of operation to close the exhaust valve during the late post injection is illustrated in timing chart 400 of FIG. 4. As shown by a solid line at 416 of FIG. 4, during the late post injection 412, the valve lift amount is zero (e.g., the exhaust valve is closed) and the exhaust valve is open (e.g., the exhaust valve is lifted) before and after and the late post injection. Another example of the late post injection is illustrated in graph 500 of FIG. 5.

Graph 500 in FIG. 5 shows a pressure trace of the cylinder pressure as well as fuel injection during the 4-stroke engine cycle. As shown, the cylinder pressure increases significantly during the compression and power strokes when the main fuel injection is executed. Graph 500 also demonstrates recompression around the time of the late post injection due to activation of the VVA system and the exhaust valve close prior to the late post injection during the exhaust stroke. Thus, by closing the exhaust valve prior to 40 degrees CA BTDC, pressure in the cylinder may be increased.

In such a configuration in which the exhaust and intake valves are closed during the late post injection, the engine load may be increased and recompression may be generated to increase pressure/density and temperature inside the cylinder. As a result, additional heat (e.g., heat in addition to the exotherm generated by the oxidation of fuel at the catalyst) may be generated by the engine, which may be provided to the exhaust system including the particulate filter. In this way, for a given amount of fuel and timing, a greater amount of heat may be supplied to the DPF via a late post injection in the second mode of operation than a late post injection in the first mode of operation. As such, a smaller amount of fuel may be used to achieve a desired exotherm across the catalyst for a late post injection during the second mode of operation and, thus, the chance of degradation of engine components may be further reduced.

As described above with respect to the first mode of operation, the timing of the late post injection after 40 and 0 degrees CA BTDC during the second mode of operation may be based on, for example, an amount of heat requested to increase the temperature of the particulate filter and/or the difference between the current temperature and the desired temperature of the of the DPF. Further, the timing of the injection during the second mode of operation may be different than the timing of the injection during the first mode of operation due to, for example, the difference in heat generated in the cylinder when the exhaust valve is open or closed.

Likewise, the amount of fuel injected during the late post injection in the second mode of operation may be based on parameters such as an exhaust air-fuel ratio and/or the difference between the current temperature and the desired temperature of the DPF, as described above for the first mode of operation. The amount of the injection may be different for the second mode of operation than for the first mode of operation. For example, for a given exhaust air-fuel ratio, the amount of fuel injected during the second mode of operation may be less than that injected during the first mode of operation.

Further, a late post injection may occur via the second mode of operation during one or more engine cycles for a single regeneration of a diesel particulate filter. The number of engine cycles in which the injection occurs may depend on, for example, the desired exotherm across the catalyst.

In this manner, late post injection may be performed during the exhaust stroke of an engine cycle in order to reduce the opportunity for conditions such as cylinder wall wetting to occur while increasing the temperature of a diesel particulate filter. Depending on the amount of heat desired and operating parameters such as exhaust air-fuel ratio, the late post injection may occur via one of two modes of operation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling an engine comprising:
during a regeneration of a particulate filter, increasing an opening amount of an exhaust valve of a cylinder at a first time during an exhaust stroke of the cylinder;
closing the exhaust valve after increasing the exhaust valve opening amount;
injecting fuel in the cylinder while the exhaust valve is closed during the exhaust stroke; and
opening the exhaust valve a second time during the exhaust stroke.

2. The method of claim 1, wherein the injecting of fuel occurs after 40 degrees CA before top dead center, and wherein the fuel is injected to a bowl on a face of a piston without hitting walls of the cylinder.

3. The method of claim 2, wherein the injection of fuel during the exhaust stroke is not combusted in the cylinder and exits the cylinder as the exhaust stroke continues, and further comprising closing the exhaust valve after opening the exhaust valve a second time before the piston of the cylinder reaches bottom dead center.

4. The method of claim 2, wherein the injection of fuel occurs during the exhaust stroke of an engine cycle, where the engine cycle is a 4-stroke combustion cycle, and while an intake valve of the cylinder is closed.

5. The method of claim 2, wherein the injection of fuel commences when the piston is moving toward top dead center and when at least some of the injected fuel impacts the bowl and is blocked from the walls by the bowl, the injected fuel sprayed in a spray pattern forming a reverse cone shape, with an apex of the cone having an angle matching a cone contained within the bowl.

6. The method of claim 1, wherein an amount of fuel injected via the injection of fuel while the exhaust valve is closed is further based on an exhaust air-fuel ratio.

7. The method of claim 1, wherein the injection of fuel occurs during one or more engine cycles during the regeneration of the particulate filter.

8. A method for controlling an engine in a vehicle, the engine having an exhaust passage, the method comprising:
during a regeneration of a diesel particulate filter positioned in the exhaust passage, injecting fuel into a cylinder during a cycle of the cylinder at least via a late post injection in an exhaust stroke of the cylinder;
prior to the late post injection and during the cycle of the cylinder, adjusting a variable valve actuation system to close an open exhaust valve of the cylinder in which the fuel is injected during the exhaust stroke; and
opening the exhaust valve during the exhaust stroke after the late post injection.

9. The method of claim 8, where injecting fuel into the cylinder occurs without fuel hitting cylinder walls.

10. The method of claim 8, wherein an intake valve is held closed during the late post injection.

11. The method of claim 9, wherein the late post injection commences after 40 degrees CA before top dead center, and wherein the exhaust valve is closed prior to 40 degrees CA before top dead center, but opened before top dead center exhaust stroke.

12. The method of claim 8, wherein a piston within the cylinder has a face with a bowl, and, during the late post injection, at least a portion of the fuel is injected in the bowl of the piston.

13. The method of claim 8, wherein fuel is injected via late post injection in one or more engine cycles during the regeneration of the diesel particulate filter.

14. The method of claim 8, where all of the fuel of the late post injection impacts a bowl in a piston of the engine.

15. The method of claim 11, wherein an amount of fuel injected via the late post injection while the exhaust valve is closed is based on an exhaust air-fuel ratio.

16. A system for controlling an engine in a vehicle, the engine having an exhaust passage, the system comprising:
a cylinder with a piston having a face with a bowl;
a variable valve actuation system coupled at least to an exhaust valve of the cylinder; and
a control system including executable instructions stored in a non-transitory medium to identify regeneration of a diesel particulate filter in the exhaust passage; in response to the regeneration, in a first mode of operation, inject fuel into the cylinder via a late post injection in an exhaust stroke of a cycle of the cylinder while an exhaust valve is open; and in response to the regeneration in a second mode of operation, inject fuel into the cylinder via a late post injection during an exhaust stroke of a cycle of the cylinder, adjust the variable valve actuation system to be open a first time before the late post injection during the cycle of the cylinder, adjust the variable valve actuation system to close the exhaust valve during the late post injection and during the cycle of the cylinder, and adjust the variable valve actuation system to open the variable valve actuation system after the late post injection during the cycle of the cylinder.

17. The system of claim 16, wherein during the first mode of operation and the second mode of operation, the late post injection occurs after 40 degrees CA before top dead center during the exhaust stroke of the cylinder.

18. The system of claim 17, wherein between 30 and 40 degrees CA before top dead center, fuel from the late post injection is injected in the bowl of the piston.

19. The system of claim 16, wherein during the second mode of operation, the control system further closes the intake valve during the exhaust stroke.

20. The system of claim 16, wherein an amount of fuel injected via the late post injection while the exhaust valve is closed is based on an exhaust air-fuel ratio and the amount of fuel for the first mode of operation is different than the amount of fuel for the second mode of operation.

* * * * *